June 12, 1934.  L. P. DWYER  1,962,180
HUMIDIFYING RADIATOR
Filed June 12, 1931  2 Sheets-Sheet 2
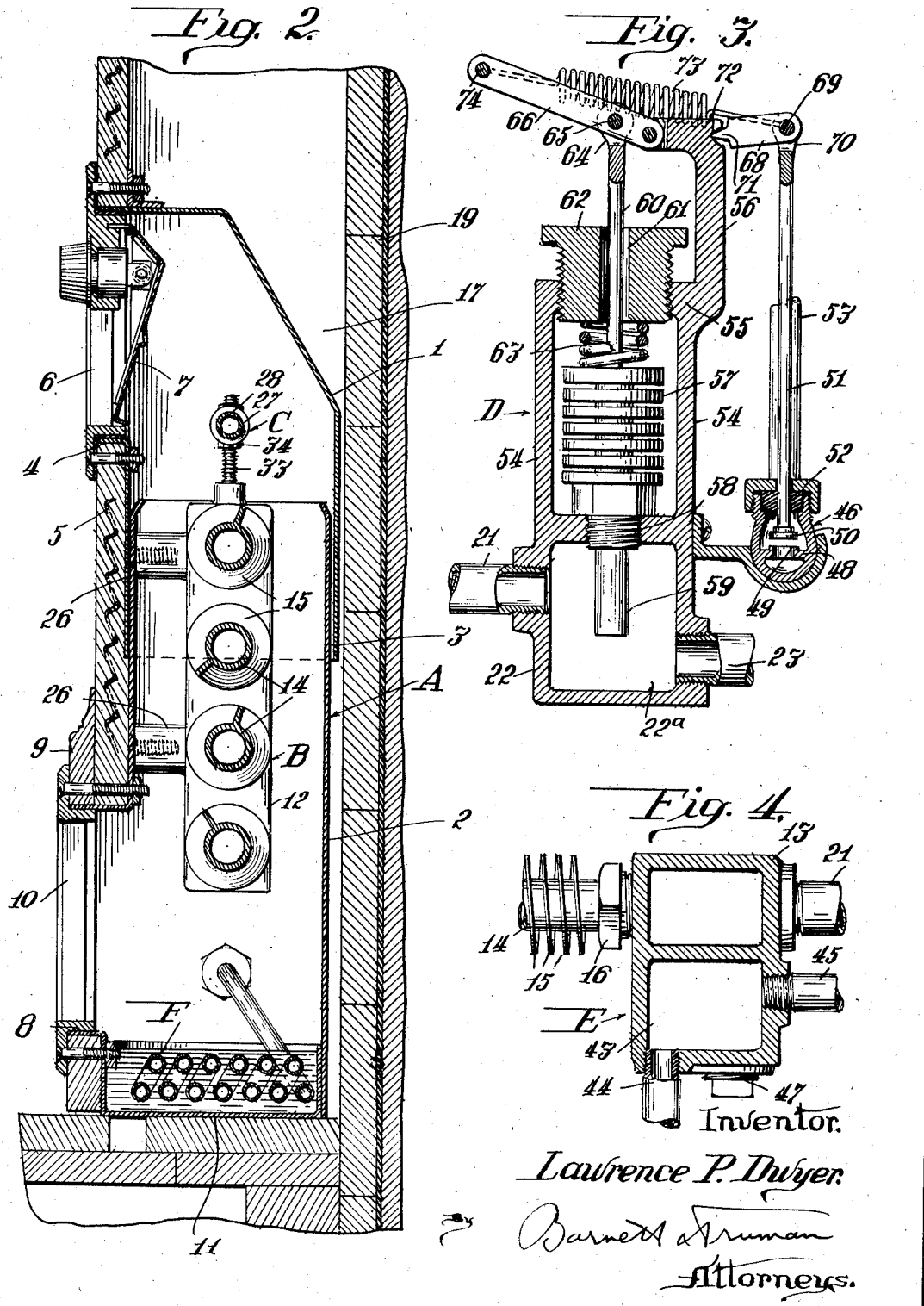

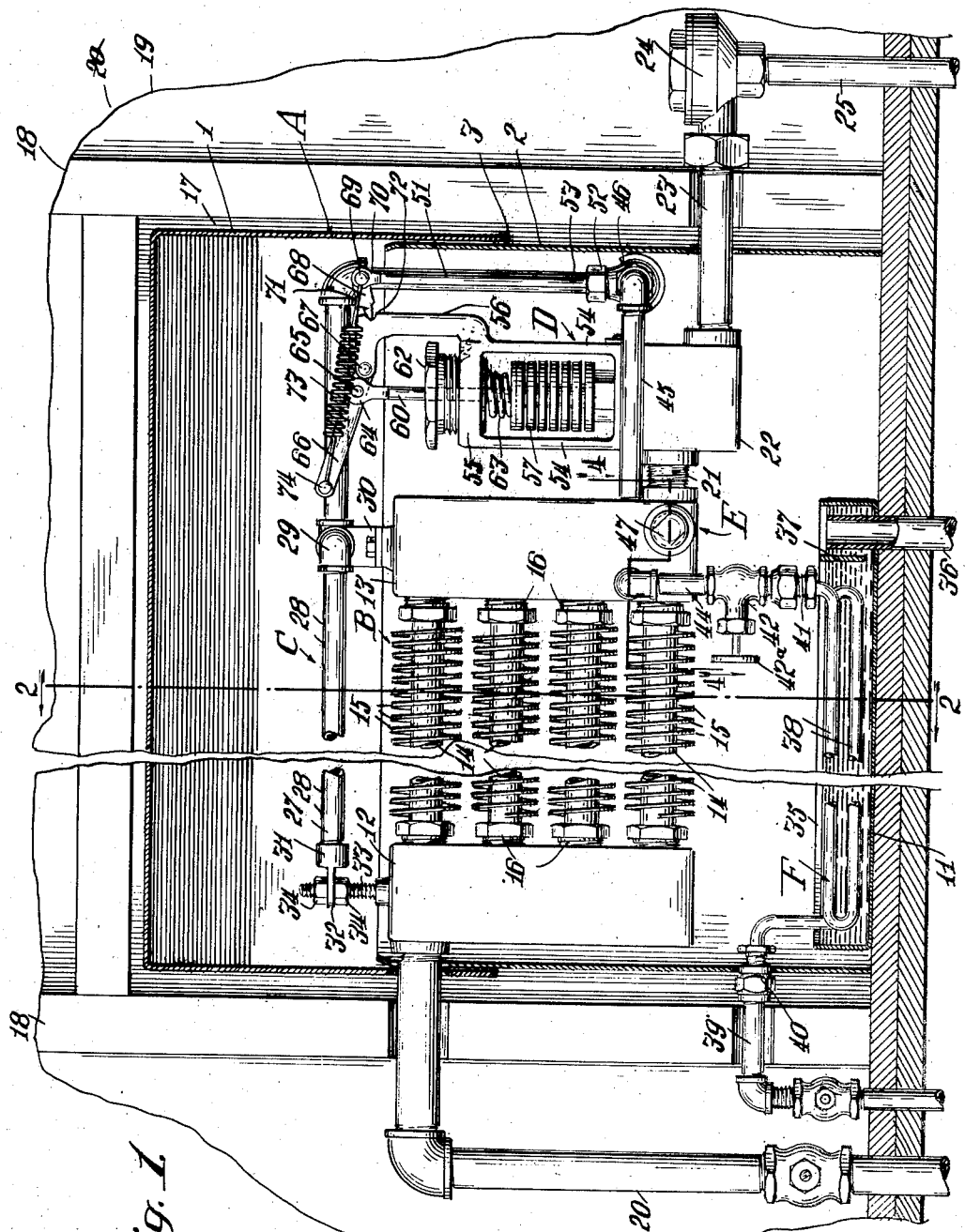

Patented June 12, 1934

1,962,180

UNITED STATES PATENT OFFICE 1,962,180

HUMIDIFYING RADIATOR

Lawrence P. Dwyer, Winnetka, Ill., assignor to C. A. Dunham Company, Marshalltown, Iowa, a corporation of Iowa Application June 12, 1931, Serial No. 543,872

13 Claims. (Cl. 237—78)

This invention relates to certain new and useful improvements in a humidifying radiator, and more particularly to a combined radiator and humidifier adapted to be mounted within a casing and concealed in a recess within a building wall. A concealed radiator of this same general type is disclosed and claimed in my copending application Serial No. 543,871 filed June 12, 1931. The improved humidifying radiator specifically disclosed in this present application is adapted to be mounted within a casing provided with inlet and outlet grilles and dampers of the same general type disclosed in said copending application, and as broadly disclosed hereinafter.

The general purpose of this invention is to provide a device for automatically maintaining the desirable humidity or percentage of moisture in the air within a room or building as this air is heated artificially, that is as the temperature of the air is raised above that of the outside air.

Air at a given temperature has a definite capacity for carrying moisture and when this limit of capacity has been reached the air is said to be "saturated". The term "relative humidity" describes the condition of the air with relation to its moisture content, being the relation of the actual moisture content of the air to the amount of moisture the air carries when saturated at the given temperature. Ordinary atmospheric air generally averages about 70% relative humidity except in localities where the air is very dry. The amount of moisture which a given quantity of air can hold depends upon its temperature, the capacity for carrying moisture increasing as the temperature rises. As ordinary atmospheric air increases in temperature, it tends to pick up additional moisture, thereby keeping the relative humidity comparatively constant. If, however, the temperature of a confined body of air is increased by artificial means and no provision is made to add to the moisture content, it will be apparent that the relative humidity of the air will decrease as the temperature is raised. Furthermore moisture carried by the air within a building is lost in several ways. Part is absorbed by furniture and other objects in the building, part is condensed and deposited on cold exposed surfaces, and some is lost with air which filters out of the building. For all of these reasons it is desirable to add a certain proportion of moisture to the air as the temperature of the confined air is raised. It is not practical or desirable to maintain the relative humidity within a building which is being heated as high as the relative humidity of out-door air at the same temperature, since the condensation of moisture on the exposed building surfaces would become so great as to be undesirable. At the same time, a certain quantity of moisture should be added, and the rate at which this additional moisture is supplied should increase roughly in proportion to the rate at which heat is supplied to the building.

According to the present invention, means is provided for discharging water in limited quantities onto the heated exterior surfaces of the radiator so that this water will tend to flow downwardly over the radiator in opposition to the upwardly flowing air currents, the heated water being vaporized and absorbed by the heated air. Automatic means is provided whereby the flow of water is cut off until the radiator has been heated to a predetermined temperature, more particularly until the radiator has been filled with the heating medium and this heating medium comes in contact with a thermostatic control device at the outlet of the radiator. When this radiator temperature has been reached, the water is permitted to flow onto the radiator and is vaporized thereby. As the temperature of the radiator rises, the rate at which the water will be vaporized also increases. Surplus water drains into a drip pan located in the lower portion of the casing, wherein a certain predetermined volume of this heated water is maintained. This body of water is used to pre-heat the incoming water, and is also vaporized to some extent by the air flowing therethrough. Means is provided to drain surplus, unvaporized water from the drip pan.

The general object of this invention is to provide an improved humidifying radiator of the type briefly described hereinabove and disclosed more in detail in the specifications which follow.

Another object is to provide an improved humidifying device which is entirely automatic in its operation and which operates to supply moisture in the proper proportions whenever the radiator is filled with heating medium.

Another object is to provide means for removing incrustants or incrusting salts from the water before the water reaches the discharging apparatus.

Another object is to provide means for insuring an equal distribution of water over the exterior surface of the radiator.

Another object is to provide improved means for pre-heating the incoming water.

Another object is to provide improved thermostatically operated means for controlling the supply of water to the humidifier.

Other objects and advantages of the invention will be more apparent from the following detailed description of one approved form of apparatus embodying the principles of this invention.

In the accompanying drawings:

Fig. 1 is a front elevation of the humidifying radiator, partially broken away, portions of the apparatus, and the enclosing casing being shown in vertical section.

Fig. 2 is a transverse vertical section through the assembly, this view being taken substantially on the line 2—2 of Fig. 1.

Fig. 3 is a vertical section, on a larger scale, through the thermostatically controlled valve mechanism.

Fig. 4 is an enlarged horizontal section, taken substantially on the line 4—4 of Fig. 1.

The principal elements of this combination are the casing A, in which the humidifying radiator is mounted, the radiator B, the water-discharging device C, the thermostatic control mechanism D, the incrustant removing device E, and the water-preheater F.

The casing A comprises an upper section 1 and a lower section 2 which telescope one over the other, as indicated at 3, whereby the effective height of the casing may be adjusted to suit the requirements of the individual installation. This casing and its appurtenances may be of the same general type as set forth and claimed more in detail in my copending application for Concealed radiator, Serial No. 543,871 hereinabove referred to. The upper front portion of the upper casing section 1 is provided with a forwardly projecting collar 4 which extends through the inner sheathing 5 of the building wall, there being an outlet grille 6 covering and projecting into the outlet air passage formed by collar 4. The damper, indicated generally at 7, may control the flow of air through the casing A, all as disclosed in detail in said copending application. The lower casing section 2 is provided with a forwardly projecting collar 8 which extends through the inner wall sheathing 5 and the base board 9 and receives the inlet grille 10. This inlet air passage is preferably positioned somewhat above the bottom 11 of the casing so as to provide a pocket or depression beneath the inlet opening, in which is positioned the drip-pan and preheater of the humidifying system, as hereinafter described.

The radiator B, in the preferred form here shown, comprises a pair of similar hollow headers 12 and 13 connected by a plurality of thin drawn-metal radiating tubes 14 provided with spiral radiating fins 15. These radiating tubes are arranged parallel with one another in a vertical series, each tube extending horizontally between the two headers 12 and 13, and the respective ends of the tubes being sealed in open communication with the headers by means of clamping nuts 16, preferably in the manner specifically disclosed and claimed in my copending application for Cabinet type unit heater—Serial No. 523,137, filed March 16, 1931.

One of the principal objects of this type of radiator is to secure the maximum of heating surface within a minimum space, thus particularly adapting the radiator for use within a wall recess as part of a concealed radiation system. The dimensions of the casing A must be limited so that it will fit within one of the recesses 17 between two adjacent studs 18 of the building framework. The width of the casing must be less than the distance between two of these studs, and the depth of the casing is limited by the depth of the recess between the front wall sheathing 5 and the outer wall 19. The radiator B, as well as the humidifying apparatus attached hereto, are mounted entirely within the casing A, and consequently it is necessary to provide a radiator of relatively small size, but with a relatively large heating capacity. While the radiator hereinabove described is preferred, it will be apparent as the description proceeds that other suitable types of radiators could be used with the humidifying apparatus hereinafter disclosed. It is intended that this radiator be connected as a part of a steam or vapor heating system, preferably a differential sub-atmospheric steam heating system of the type disclosed and claimed in the patent to Dunham, No. 1,644,114, granted October 4, 1927. The steam is supplied through riser 20 which projects through one end wall of the casing A and connects with the top of header 12, and the outlet pipe fitting 21 leads from the lower end of the other header 13 into the housing 22 of thermostatic control apparatus D, from which pipe 23 leads through the casing A to connect with steam trap 24, from which condensate and non-condensible gases are drawn or drain out through return pipe connection 25. The radiator B is supported within the lower casing section 2 in any suitable manner, as by means of the brackets indicated at 26. Preferably, when mounted in operating position, the radiating tubes 14 will be positioned substantially horizontally and one above another in a vertical series so that when water is discharged onto the upper tube 14, in the manner hereinafter described, this water will drip successively from one radiating tube to another until it becomes vaporized.

The water-discharging device C comprises a distributing pipe or drip pipe 27 formed along its top edge with a longitudinally extending series of openings 28 properly proportioned with respect to the cross-sectional area of the pipe for distributing water evenly throughout the length of the pipe. Pipe 27 is connected at one end with the angular pipe fitting 29 pivotally mounted in pedestal 30 supported on the header 13. The other end of this pipe 27 is closed by a cap 31 from which projects a bracket plate 32 perforated to receive the upwardly projecting screw 33 mounted on the top of header 12. Nuts 34 threaded on screw 33 engage the opposite faces of plate 32. By properly adjusting the nuts 34 the pivoted pipe 27 may be positioned exactly horizontally or level. This position is desirable since the water will flow through the openings 28 at a very low velocity and overflow around the sides of the pipe under the influence of gravity, and a level positioning of the pipe is essential to obtain uniform water distribution, that is an equal flow of water through all of the various openings 28.

The water discharged from pipe 27 drips onto the uppermost radiating tube 14 and thence down over the several tubes of the radiator, and any water that is not vaporized drips from the lowermost tube 14 into the drip-pan 35 which may form a portion of the pre-heater F. This drip pan 35 is supported in the lower portion of the casing 2 below the air inlet opening 10, and may be formed integrally with the casing 2 or be fitted therein. A drain pipe 36 leading to the sewer projects upwardly through one end portion of the drip pan so as to maintain a predetermined supply of water within the drip pan, and a baffle 37 projects downwardly adjacent the drip pipe so that the water withdrawn will be taken from the colder lower portion of the accumulated water within the pan. The water retained in drip pan 35 is heated by its passage over the radiator tubes, and also is heated by downward radiation from the radiator B. Some of this heated water in pan 35 will be vaporized by the air drawn in through grille 10 which air flows over this drip pan before passing upwardly around and between the radiator tubes 14. The pre-heater F also includes a pipe coil 38 of any approved form, which is wholly or partially immersed in the hot water in drip pan 35. Water from any suitable source of supply is conducted in through supply pipe 39 extending through one end wall of casing A and connected at 40 with one end of the pre-heater coil 38. The other end of the coil is connected at 41 with the inlet side of the water regulating valve 42. This valve may be of any suitable form, preferably being a needle valve provided with a fine pitched thread so that the valve can be regulated to relatively small increments of opening. The valve will be set by means of handle 42ª so as to maintain a uniform flow of water to the discharge mechanism C.

The incrustation chamber E, in the form here shown, has one of its walls integral with one of the side walls of header 13, as best shown in Fig. 4. Water flows into the chamber 43 from valve 42 through pipe connection 44. Water flows from the upper portion of chamber 43 through pipe 45 to the automatic cut-off valve 46. As is well known, the water ordinarily available contains certain dissolved salts which will be deposited as an incrustation in the restricted outlet openings 28 so as to eventually close these openings. The purpose of the device E is to remove the greater portion of these salts from the water. Since the solubility of these incrusting salts usually decreases as the temperature of the water increases, these salts will be precipitated out or deposited within the chamber 43 through which the water flows very slowly and in which the water is heated from the steam header 13. A rather large removable plug 47 closes an opening in the lower portion of remover E, through which the incrustation materials may be removed.

The cut-off valve 46 as here shown comprises a valve housing having an internal web 48 formed with a valve seat 49 adapted to be closed by the valve disc 50 carried at the lower end of valve stem 51 projecting into the housing through stuffing box 52. When the valve disc 50 is raised, as shown in Fig. 3, water flows from pipe 45 through the valve 46 and thence through pipe connections 53 to the pivotal fitting 29 and thence into discharge or drip pipe 27. When the valve stem 51 is lowered to force valve disc 50 against the seat 49, the flow of water will be cut off.

A supporting frame is mounted on or formed on the casing 22 which encloses the heating chamber 22ª, this frame comprising upwardly extending struts 54 carrying an upper supporting head 55, from which projects upwardly a bracket 56. The thermostatic expansion member housed within this supporting frame between the struts 54 comprises a hollow metallic bellows structure 57 anchored at its lower end 58, in the upper wall of casing 22, and connected with a bulb 59 which projects downwardly into the heating chamber 53. The bulb 59 and bellows 57 contain a suitable volatile fluid which volatilizes or expands when chamber 53 is filled with heating medium, such as steam, thus causing bellows 57 to expand upwardly. When heating medium is absent from chamber 53, the bellows 57 will contract downwardly. An operating rod or stem 60 is secured at its lower end to the top of bellows 57 and projects upwardly through an opening 61 in the adjusting nut 62 threaded in supporting head 55. The loading or adjusting spring 63 is confined between nut 62 and the top of bellows 57. The clevis 64 at the upper end of rod 60 is pivoted at 65 to an intermediate portion of link 66 pivoted at one end 67 to the bracket 56. A short lever 68 is pivoted at one end 69 between the arms of a clevis 70 formed at the top of valve stem 51 and is provided at its opposite end with a knife edge 71 engaging a suitable seat 72 formed in bracket arm 56. A contractile spring 73 is secured at one end 74 to the free end of link 66 and is secured at its opposite end to the pivotal connection 69 at the outer end of lever 68. It will now be seen that when the expansion of bellows 57 has raised the end 74 of spring 73 above the line connecting the pivots 67 and 69, spring 73 will contract and snap the lever 68 upwardly to the position shown in Fig. 3, thereby elevating stem 51 and opening the cut-off valve 46. When the contraction of bellows 57 has lowered end 74 of the spring below the line connecting pivots 67 and 69, the spring 73 will again contract and snap lever 68 downwardly so as to close valve 46. Although the movement of the thermostatic control mechanism is gradual in both directions, the snap-mechanism just described serves to quickly and positively open and close the cut-off valve at certain critical temperatures.

When this humidifying apparatus has once been properly installed and the valves have been adjusted, the apparatus requires no further attention (except for cleaning or repairs) but responds automatically to the operation of the heating system. When the heating medium is removed or condensed from the radiator B, the thermostatic control mechanism will contract so as to close cut-off valve 46 and no water will flow through the humidifier. When the supply of steam or vapor is turned on, the humidifying apparatus does not commence to operate until the radiator B has become entirely filled with the heating medium and this medium flows through pipe connection 21 into heating chamber 22ª. The thermostatic bellows will then expand so as to cause cut-off valve 46 to be opened and water will now flow to and through the distribution pipe 27 and will drip downwardly over the radiator tubes. Some of this water will be vaporized through contact with the heated radiator tubes and will be taken up by the air stream which flows in through grille 10 upwardly through the casing A and is discharged back into the room through upper grille 6. It will be noted that this air is simultaneously heated by the radiator B and supplied with added moisture by the humidifying apparatus. As the temperature of the radiator is increased, an increasing proportion of the water dripping over the radiator will be vaporized thereby. The water that is not vaporized drips into the pan 35 until this pan is substantially filled and excess water drains out through pipe 36. The water in drip pan 35 has been heated while in contact with the radiator and is subsequently heated by radiation from the radiator positioned above the pan. The air which flows in through lower grille 10 absorbs and carries away some of this heated water in pan 35. The incoming water admitted through pipe 39 flows first through the preheater coil 38 and absorbs heat from the water in drip pan 35 and is also heated by radiation from radiator B. It will be noted that this general arrangement establishes a tendency to maintain uniform temperature difference between the incoming air and the water which is to be taken up by this air, thus obtaining improved evaporating effect. The pre-heated water flows into and through the incrustation chamber E wherein the water is further heated, due to the close contact with the heating medium in header 13, and wherein a large proportion of the incrusting salts are deposited. The pre-heated water then flows to and through the cut-off valve 46 and through the pipe connections to the distributing or drip pipe 27.

It will be noted that when the supply of heating medium to the radiator B is cut off, as for example by means of a room thermostat, there will, at least temporarily, be no further heating of the air within the room, and consequently there will be no immediate necessity for adding further moisture to the air, consequently the flow of water through the humidifying apparatus is automatically cut off when the heating medium ceases to flow through the radiator. It will therefore be seen that a means is provided for automatically supplying moisture to the air in the room at a rate which is roughly proportional to the rate at which this air is being heated.

It is to be understood that the heat-transfer device shown at F could take a variety of forms other than the simple form here shown by way of example, and might be in the form of a double or multiple walled receptacle, through certain portions of which the incoming water will flow in close contact with the heated water returned from the radiator. The effect of the pre-heating devices F and E is such that the water, when first exposed to the air currents flowing through the casing A, has been raised to an initial temperature directly proportional to the steam temperature within the radiator B so that an effective rate of vaporization is maintained at all temperatures.

I claim:

1. A humidifying apparatus comprising in combination with a radiator of a heating system, means for supplying heating medium to and through the radiator, means positioned above a portion of the radiator for discharging water thereonto, a receptacle positioned beneath the radiator for collecting unvaporized heated water, and a conduit for supplying water to the discharging means, a portion of said conduit being immersed in the water in the receptacle for preheating the water in the conduit.

2. A humidifying apparatus comprising in combination with a radiator of a heating system, means for supplying heating medium to and through the radiator, a discharge pipe provided with a longitudinal series of discharge orifices positioned above the radiator, a drip-pan positioned beneath the radiator, a conduit for supplying water to the discharge pipe, said conduit having a portion positioned in the pan to preheat the water, and means responsive to temperature changes adjacent the radiator for regulating the flow of water to the discharge pipe.

3. A humidifying apparatus comprising in combination with a radiator of a heating system, means for supplying heating medium to and through the radiator, a discharge pipe provided with a longitudinal series of discharge orifices positioned above the radiator, a drip-pan positioned beneath the radiator, a conduit for supplying water to the discharge pipe, said conduit having a portion positioned in the pan to preheat the water, and a thermostatically controlled valve responsive to the temperature of the heating medium at the outlet of the radiator for controlling the flow of water to the discharge pipe.

4. A humidifying apparatus comprising in combination with a radiator of a heating system, means for supplying heating medium to and through the radiator, a discharge pipe provided with a longitudinal series of discharge orifices positioned above the radiator, a drip-pan positioned beneath the radiator, a conduit for supplying water to the discharge pipe, said conduit having a portion positioned in the pan to preheat the water, a depositing chamber connected in the conduit and positioned closely adjacent the radiator for removing incrusting salts from the water, and means responsive to temperature changes adjacent the radiator for regulating the flow of water to the discharge pipe.

5. A humidifying apparatus comprising in combination with a radiator of a heating system, means for supplying heating medium to and through the radiator, a discharge pipe provided with a longitudinal series of discharge orifices positioned above the radiator, means for leveling the discharge pipe to equalize the flow through the orifices, a drip-pan positioned beneath the radiator, a conduit for supplying water to the discharge pipe, said conduit having a portion positioned in the pan to preheat the water, and means responsive to temperature changes adjacent the radiator for regulating the flow of water to the discharge pipe.

6. A humidifying apparatus comprising in combination with a radiator of a heating system, the radiator comprising a pair of similar end headers and a plurality of horizontal radiating tubes connecting the headers and positioned in a vertically arranged series, an inlet for heating medium leading into one header, an outlet leading from the other header, a discharge pipe provided with a longitudinal series of discharge orifices positioned above the uppermost radiating tube, a drip-pan positioned beneath the lowermost tube, a conduit for supplying water to the discharge pipe, a cut-off valve in this conduit, and a thermostat positioned in the outlet conduit for the heating medium and actuating the cut-off valve.

7. A humidifying apparatus comprising in combination with a radiator of a heating system, the radiator comprising a pair of similar end headers and a plurality of horizontal radiating tubes connecting the headers and positioned in a vertically arranged series, an inlet for heating medium leading into one header, an outlet leading from the other header, a discharge pipe provided with a longitudinal series of discharge orifices positioned above the uppermost radiating tube, means for leveling the discharge pipe to equalize the flow through the orifices, a drip-pan positioned beneath the lowermost tube, a conduit for supplying water to the discharge pipe, a cut-off valve in this conduit, and a thermostat positioned in the outlet conduit for the heating medium and actuating the cut-off valve.

8. A humidifying apparatus comprising in combination with a radiator of a heating system, the radiator comprising a pair of similar end headers and a plurality of horizontal radiating tubes connecting the headers and positioned in a vertically arranged series, an inlet for heating medium leading into one header, an outlet leading from the other header, a discharge pipe provided with a longitudinal series of discharge orifices positioned above the uppermost radiating tube, a drip pan positioned beneath the lowermost tube, a conduit for supplying water to the discharge pipe, a portion of this conduit being located in the drip-pan for preheating the water, a cut-off valve in this conduit, and a thermostat positioned in the outlet conduit for the heating medium and actuating the cut-off valve.

9. A humidifying apparatus comprising in combination with a radiator of a heating system, the radiator comprising a pair of similar end headers and a plurality of horizontal radiating tubes connecting the headers and positioned in a vertically arranged series, an inlet for heating medium leading into one header, an outlet leading from the other header, a discharge pipe provided with a longitudinal series of discharge orifices positioned above the uppermost radiating tube, a drip-pan positioned beneath the lowermost tube, a conduit for supplying water to the discharge pipe, a depositing chamber connected in this conduit and positioned against one of the headers, a cut-off valve in this conduit, and a thermostat positioned in the outlet conduit for the heating medium and actuating the cut-off valve.

10. In combination with a casing housed within a recess in a building wall and having a lower air inlet opening and an upper discharge opening for heated air, a radiator positioned within the casing, an inlet conduit for heating medium leading to the radiator, an outlet conduit leading from the radiator, means positioned above the radiator for discharging water thereonto, a drip-pan beneath the radiator over which the incoming air flows, a conduit for supplying water to the discharging means, a cut-off valve in this latter conduit, and thermostatic means positioned partly in the radiator outlet conduit so as to be controlled by the temperature of the medium therein for actuating the valve to open and closed positions.

11. In combination with a casing housed within a recess in a building wall and having a lower air inlet opening and an upper discharge opening for heated air, a radiator positioned within the casing, an inlet conduit for heating medium leading to the radiator, an outlet conduit leading from the radiator, means positioned above the radiator for discharging water thereonto, a drip-pan beneath the radiator over which the incoming air flows, a conduit for supplying water to the discharging means, a portion of this conduit being located in the drip-pan for preheating the water, a cut-off valve in this latter conduit, and thermostatic means controlled by the temperature of the medium in the radiator outlet conduit for actuating the valve to open and closed positions.

12. A humidifying apparatus comprising in combination with a radiator of a heating system, a conduit for supplying heating medium to the radiator, a discharge conduit leading from the radiator, means positioned above a portion of the radiator for discharging water thereonto, a conduit for supplying water to the discharging means, a valve in this latter conduit for regulating the flow of water therethrough, and thermostatic means for controlling the valve, said means being partly positioned in the discharge conduit and responsive to the temperature of the medium leaving the radiator.

13. A humidifying apparatus comprising in combination with a radiator of a heating system, a conduit for supplying steam to the radiator, a discharge conduit leading from the radiator, a steam trap in the discharge conduit, means positioned above a portion of the radiator for discharging water thereonto, a conduit for supplying water to the discharging means, a valve in this latter conduit for regulating the flow of water therethrough, and a thermostatic means partly positioned in the discharge conduit between the radiator and steam trap, said thermostatic means functioning to open the valve when subjected to steam temperature.

LAWRENCE P. DWYER.